United States Patent
Hawley

(10) Patent No.: US 11,904,828 B2
(45) Date of Patent: Feb. 20, 2024

(54) TRACTION CONTROL ROLLBACK MITIGATION ON SPLIT MU GRADES

(71) Applicant: ZF Active Safety US Inc., Livonia, MI (US)

(72) Inventor: Shawn Hawley, Ann Arbor, MI (US)

(73) Assignee: ZF Active Safety US Inc., Livonia, MI (US)

( * ) Notice: Subject to any disclaimer, the term of this patent is extended or adjusted under 35 U.S.C. 154(b) by 899 days.

(21) Appl. No.: 16/957,813

(22) PCT Filed: Dec. 26, 2018

(86) PCT No.: PCT/US2018/067496
§ 371 (c)(1),
(2) Date: Jun. 25, 2020

(87) PCT Pub. No.: WO2019/133602
PCT Pub. Date: Jul. 4, 2019

(65) Prior Publication Data
US 2021/0061244 A1 Mar. 4, 2021

Related U.S. Application Data

(60) Provisional application No. 62/611,891, filed on Dec. 29, 2017.

(51) Int. Cl.
*B60T 8/175* (2006.01)
*B60T 8/171* (2006.01)
(Continued)

(52) U.S. Cl.
CPC ............ *B60T 8/175* (2013.01); *B60T 8/171* (2013.01); *B60T 8/1755* (2013.01); *B60T 8/245* (2013.01);
(Continued)

(58) Field of Classification Search
None
See application file for complete search history.

(56) References Cited

U.S. PATENT DOCUMENTS

| 8,145,374 B2 | 3/2012 | Farnsworth |
| 9,193,338 B2 | 11/2015 | Schaefers et al. |

(Continued)

FOREIGN PATENT DOCUMENTS

| DE | 10238230 A1 | 10/2003 |
| DE | 10334605 A1 | 3/2004 |

(Continued)

OTHER PUBLICATIONS

German Non-Final Office Action dated Jul. 19, 2023. English translation not provided.

*Primary Examiner* — Christian Chace
*Assistant Examiner* — Katherine Marie Fitzharris
(74) *Attorney, Agent, or Firm* — Robert James Harwood

(57) ABSTRACT

A stability control system of a vehicle utilizing an electronic control unit that minimizes rollback of a vehicle as a result of wheel slip immediately following a hill start assist operation. The electronic braking control module controls actuation and de-actuation of vehicle brakes on an inclined surface. Immediately following a hill start assist operation on the inclined surface after each wheel brake is de-actuated for allowing forward movement of the vehicle up the hill, a split-mu road surface condition is detected in response to sensing wheel slip for each of the wheels. The electronic control unit determines a respective undriven, or non-dominant driven, wheel having the highest coefficient of friction among the undriven, or less dominant driven wheels, as determined by the wheel speeds. The electronic braking control module actuates the vehicle brake of the undriven, or less dominant, driven wheels having the highest coefficient of friction relative to a tire/road surface interface for reduc- (Continued)

ing rollback of the vehicle. The braking of the undriven, or less dominant, driven wheel is in addition to any standard stability control braking that may already be occurring.

14 Claims, 3 Drawing Sheets

(51) Int. Cl.
*B60T 8/1755* (2006.01)
*B60T 8/24* (2006.01)
(52) U.S. Cl.
CPC ........... *B60T 8/246* (2013.01); *B60T 2201/06* (2013.01); *B60T 2210/124* (2013.01); *B60T 2270/213* (2013.01)

(56) References Cited

U.S. PATENT DOCUMENTS

| | | | |
|---|---|---|---|
| 2003/0229439 A1* | 12/2003 | Polzin | .................... B60T 8/175 |
| | | | 701/90 |
| 2004/0024513 A1* | 2/2004 | Aizawa | ................ B60T 8/4872 |
| | | | 701/70 |
| 2010/0009808 A1 | 1/2010 | Ohtsu | |
| 2015/0081182 A1 | 3/2015 | Li et al. | |

FOREIGN PATENT DOCUMENTS

| | | | | |
|---|---|---|---|---|
| DE | 102010033416 A1 | 2/2012 | | |
| KR | 100993137 B2 | 11/2010 | | |
| WO | WO-2018166862 A1 * | 9/2018 | ............. | B60K 28/16 |

\* cited by examiner

TRACTION CONTROL ROLLBACK MITIGATION ON SPLIT MU GRADES

RELATED APPLICATIONS

This application is a national stage of International Application No. PCT/US2018/067496, filed Dec. 26, 2018, the disclosure of which is incorporated herein by reference in its entirety, and which claimed priority to U.S. Provisional Patent Application No. 62/611,891, filed Dec. 29, 2017, the disclosure of which is incorporated herein by reference in its entirety.

BACKGROUND OF THE INVENTION

The present invention relates in general to stability control systems on split mu surfaces, and more specifically, stability control operations of a vehicle operating on a sloped surface after being at rest on the sloped surface.

Many vehicle controls now include electronic stability controls that are used to maintain a stability of the vehicle particularly when the vehicle has stability issues during Hill Start Assist operations. Hill Start Assist functionality includes brake pressure trapping operations to implement hill start controls. In Hill Start operations, a vehicle is temporarily stopped on an incline such as at a stop sign, stop light, or stopped in traffic. Hill Start Assist operations are designed to ramp out brake pressure as a driver, or autonomous driving system, increases the throttle, such that all the pressure is removed when the driver has input what is believed to be enough propulsive torque to progress forward up the hill.

During the time a driver removes its foot from the brake pedal and applies the acceleration pedal where a presumed to be sufficient amount of propulsive torque is generated to propel the vehicle in an ascending direction, rollback of the vehicle may occur where there is insufficient propulsive torque to propel the vehicle up the hill. As a result, the vehicle may recede down the hill until enough propulsive torque is generated to eliminate the rollback condition. Generally, the hill start assist functionality is calibrated to maintain action of all vehicle brakes autonomously until a time occurs when the sufficient amount of propulsive torque is applied to the vehicle wheels via the engine transmission to eliminate the rollback condition.

However, a typical assumption is that all four wheels will have traction to aid the vehicle up the hill, to avoid an otherwise "sticky brakes" resistive sensation. Typically, brake pressure to hold the vehicle at rest on the hill is released before any wheel slip occurs to indicate that some of the tires will not be able to contribute significantly to the uphill climb. The result is a disconcerting vehicle rollback when the driver's intention is to climb the hill. This situation becomes even more evident with a timid driver applying a delicate/cautious throttle. In addition, vehicle loading such as towing, passenger weight distribution, and hill grades that approach traction and engine power limits of a given vehicle factor into this issue. While traction control does its best to quickly find the optimal propulsive torque and cross-differential braking, there can still be significant rollback during the initial phase of the hill start launch attempt if wheel slip occurs on at least one of the driven wheels.

SUMMARY OF THE INVENTION

An advantage of the invention is a detection of a vehicle wheel slip condition immediately following a Hill start assist operation. The system monitors both wheel slip and backward movement of the vehicle after de-actuation of the vehicle brakes immediately following the Hill start assist operation. Upon detection of rollback, an undriven (including a non-dominant or less dominantly driven wheel) wheel having the highest mu, traction or grip relative to the road surface is identified and the vehicle brake of that respective undriven wheel is re-actuated to reduce rollback of the vehicle. The braking force applied to the undriven wheel is proportional to the wheel speed of the wheel (or other estimation of vehicle speed), such that the all the brake pressure returns to zero when the vehicle is ending the rollback and preparing to move forward.

An embodiment contemplates a stability control system of a vehicle utilizing an electronic control unit that minimizes rollback of a vehicle as a result of wheel slip immediately following a hill start assist operation. A plurality of wheel speed sensors measure each of the vehicle wheel speeds. A slope of a road surface is determined. An electronic control unit includes an electronic braking control module. The electronic braking control module controls actuation and de-actuation of vehicle brakes on an inclined surface. Immediately following a hill start assist operation on the inclined surface after each wheel brake is de-actuated for allowing movement of the vehicle up the hill, a split-mu road surface condition is detected in response to sensing wheel slip for each of the wheels. The electronic control unit determines a respective undriven wheel having the highest coefficient of friction at a tire/road surface interface among the undriven wheels as determined by the wheel speeds. The electronic braking control module actuates the vehicle brake of the undriven wheel having the highest coefficient of friction at the tire/road surface interface for reducing rollback of the vehicle. The braking of the undriven, or non-dominant driven, wheel is in addition to any standard stability control braking that may already be occurring.

A method is provided for minimizing rollback of a vehicle as a result of wheel slip immediately following a hill start assist operation. Wheel speeds are sensed for each of the plurality of wheels of the vehicle. It is calculated that the vehicle is on an inclined surface. Each vehicle brake actuator is de-actuated upon completion of a hill start assist operation. A rollback condition of the vehicle is determined after release of the each of the vehicle brakes. A wheel slip condition is detected for each undriven, or non-dominant driven, wheel. A split-mu road surface is determined to be between the undriven wheels of the vehicle. A determination is made of which respective undriven wheel has the highest coefficient of friction at the tire/road surface interface. An electronic braking control module actuates the vehicle brake of the undriven wheel having the highest coefficient of friction at the tire/road surface interface for reducing the movement of the vehicle rearward down the hill. The braking of the undriven, or non-dominant driven, wheel is in addition to any standard stability control braking that may already be occurring.

Other advantages of this invention will become apparent to those skilled in the art from the following detailed description of the invention and preferred embodiments, when read in light of the accompanying drawings.

DETAILED DESCRIPTION OF THE INVENTION

Figure 1:
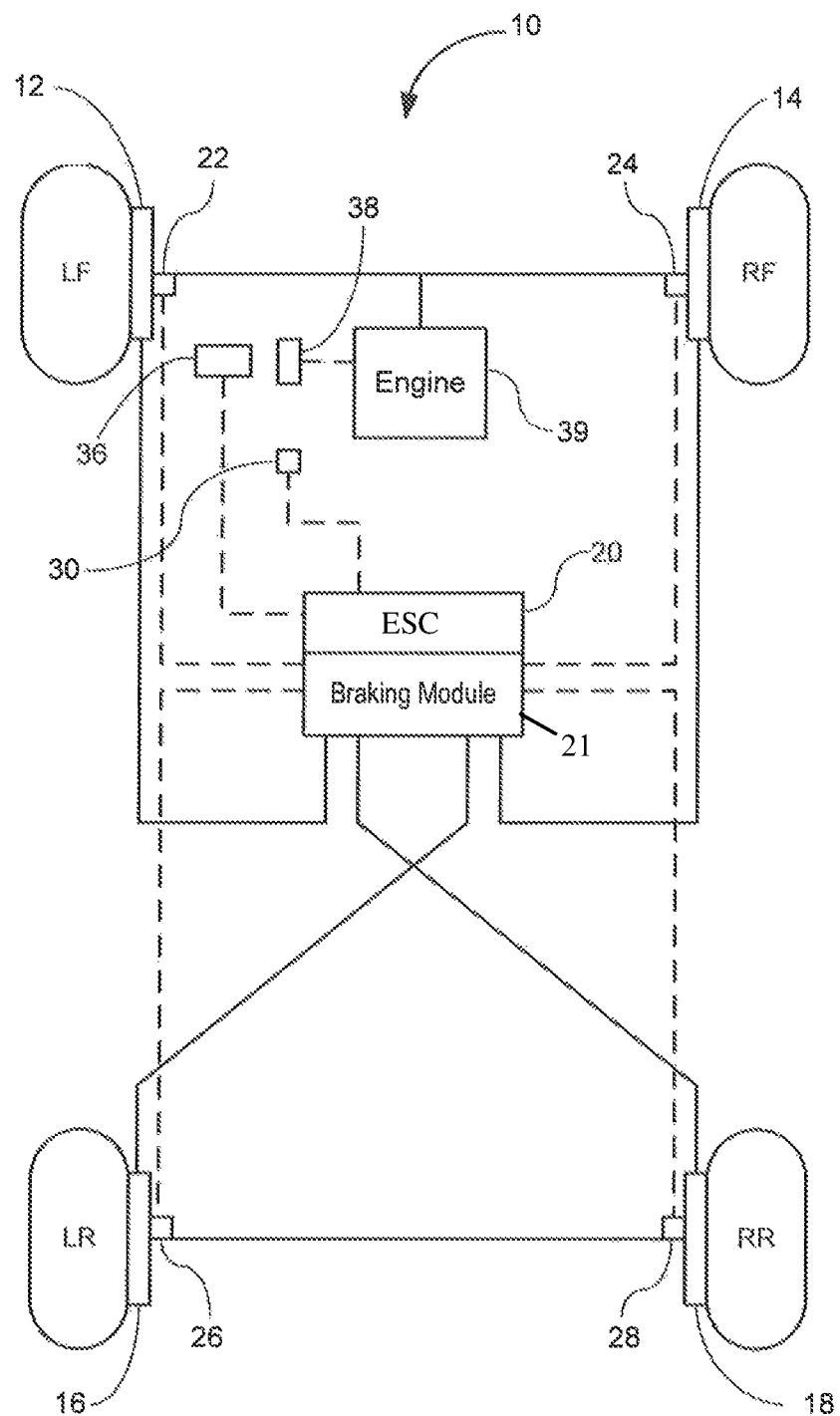
FIG. 1 is a schematic of a vehicle having a stability control system via an electronic braking control module.

Referring now to the drawings, there is shown in FIG. 1 a vehicle 10 having a stability control system in accordance with the invention for stability controls. The stability control system may suitably be used on a ground vehicle such as an automotive vehicle having four wheels and a brake for each wheel.

The vehicle is equipped with a plurality of vehicle wheels LF, RF, LR, and RR and a plurality of brake actuators—i.e., actuators and rotors—12, 14, 16, and 18 for braking an associated wheel. The plurality of brake actuators 12-18 are controlled by an electronic stability control unit (ESC) 20 that includes an electronic brake control module (EBCM) 21. EBCM 21 or similar module is a device that monitors and controls electronic braking functionality. The brake actuators 12-18 are not limited to any specific brake arrangement—e.g., a diagonal split arrangement or a front/rear split arrangement.

The ESC 20 receives inputs from various sensors including, but not limited to, the wheel speed sensors 22-28, and a sensor 30 determining an incline of a surface the vehicle 10 is on. The ESC 20 monitors the speed of each wheel and based on speed and detected wheel slip conditions, a braking strategy, anti-lock braking strategy, or traction control strategy is applied in actuating the vehicle brakes by the EBCM 21.

The sensor 30 calculates or measures an angle (degree) of a slope of a traveled surface relative to an artificial horizontal horizon. The slope may also be referred to as an angle, tilt, gradient, pitch, or level of the road surface. The incline is typically a measurement identified by "degree" or "percent."

The vehicle 10 may further include hill start assist technology or other similar technologies that utilize an electronic control unit such as the ESC 20 along with the above modules, components, and sensors to assist in transitioning the vehicle from a resting state to propelling the vehicle up the inclined surface without experiencing rollback. As used herein, "rollback" includes any rolling movement on an incline that is opposite a driver's intended direction indicated by the driver's gear selection. Furthermore, as used herein "driver" includes any automated system providing throttle and braking commands—e.g., an autonomous driving system. Hill start assist operations maintain the vehicle brakes 12-18 in an actuated position for a short duration of time after the driver has manually released a brake foot pedal 36 or an autonomous driving system releases the vehicle brakes 12-18. This prevents the vehicle 10 from rolling backwards during the time the driver removes the driver's foot from the brake foot pedal 36 to the time when the driver pushes on an acceleration pedal 38 to increase the throttle for generating torque in the engine 39 to propel the vehicle 10 in an upward ascent. Under such conditions, the brake actuators 12-18 are maintained in an actuated state until either a predetermined time elapses after the brake pedal 34 is released or after a set of conditions are present (e.g., the engine is presumed to have generated a sufficient amount of torque to begin propelling the vehicle in an upward ascent).

After the brake pressure to each of the brake actuators 12-18 are released, each of the wheels can experience different traction levels due to split-mu road surfaces. As a non-limiting example, the split-mu road surface may be a left/right split mu surface. As a result, different wheels rotating on their respective surfaces may experience different coefficient of frictions at their tire/road surface interfaces, and as a result, the wheels of the vehicle may experience different traction relative to the road surface. A vehicle wheel losses traction on the surface of the road below the wheel when wheel slip occurs. In addition, if the vehicle is on a sloped surface heading uphill, the vehicle may experience rollback due to the loss of traction as a result of the wheel slip condition. Wheel slip is a comparison between the rotational speed of the wheel and the translational velocity of the wheel center.

To apply the technique described herein after the brake actuators are de-actuated, a determination is first made whether the vehicle is rolling backwards even though a presumed sufficient amount of torque has been generated by the engine to propel the vehicle up the hill. Rollback may be determined by devices that include, but are not limited to, directional wheel speed sensors. Directional wheel sensors mounted on the undriven wheels of the vehicle provide the direction that the vehicle is moving. As used "undriven wheel" includes a driven wheel receiving less engine or propulsive torque than any other driven wheels—i.e., a less or non-dominant or less dominantly driven wheel. For example, if the vehicle is a rear wheel drive vehicle, then wheel slip due to engine torque will occur only on the rear wheels. The undriven front wheels are free to rotate (in the absence of brake pressure) and will rotate according to the direction that the vehicle is moving. As a result, if a wheel slip is occurring while on an incline and the rear wheels cannot gain traction where the vehicle begins to roll backwards down the hill, the undriven front wheels are free to rotate (in the absence of brake pressure) and the directional wheel speed sensors disposed on the front wheels will indicate which direction the vehicle is actually moving. It should be understood that other devices and schemes aside from directional wheel speed sensors may be used to determine a direction of travel.

In response to a determination that the vehicle is rolling backwards, the ESC 20 determines the wheel slip condition of each wheel. Traction control is a control mode where the system monitors for wheel slip conditions and controls the engine torque—i.e., propulsive torque—as well as braking at each of the wheels to correct the instability condition and optimize traction of the total vehicle. The determination is made by monitoring the wheel slip on each of the wheels via the wheel speed sensors 22-28 and providing wheel speed data to the ESC 20. Based on the data supplied by each wheel speed sensor, the ESC 20 can determine whether each of the wheels are experiencing different coefficient of frictions at their tire/road surface interfaces. ESC 20 determines which wheel has the lowest wheel slip and designates that as the wheel having the highest mu at the tire/road surface interface or traction. For a fully undriven wheel, the wheel slip may be determined by assuming it to be diagonally opposite the highest slipping driven wheel. For a rear wheel drive based driveline arrangement, the wheel selected is preferably one of the front vehicle wheels (e.g., LF or RF wheel). For a front wheel drive based driveline arrangement, the wheel selected is preferably one of the rear vehicle wheels (e.g., LR or RR wheel).

After rollback is identified, in response to identifying which undriven wheel (or non-dominant driven wheel) has the highest mu, the ESC 20 in cooperation with the EBCM 21 autonomously actuates the brake actuator associated with the identified wheel having the highest mu with respect to the tire/road surface interface. For a rear wheel drive based application, the undriven wheel is expected to be a front wheel on an opposite side of the vehicle 10 from the rear wheel with the highest slip. This is in addition to any standard stability control braking that may already be occurring.

This additional braking is performed since the wheel experiencing the highest mu among each of the undriven wheels with the underlying road surface has the best traction among the plurality of undriven wheels. Therefore, this respective wheel experiencing the highest mu among the other undriven wheels has the best opportunity to maximize brake force with the surface of the road which will reduce the vehicle rolling back or at least slow the vehicle rolling back should the braking force to this wheel be re-applied. The re-actuation of the brake actuator of the selected wheel is preferably proportional to the speed of the wheel or other, most reliable vehicle speed estimation, such that the pressure returns to zero when the vehicle is ending the rollback and preparing to move forward. As the vehicle is ending the rollback and preparing to move forward, the braking force is proportionally being reduced to zero to allow for a smooth and unnoticeable transition to the driver and reduce resistance to the forward uphill movement.

For two driven wheels on a common, driven axle, an assumption is made as to which undriven wheel is experiencing the highest mu surface. Specifically, it is assumed that the undriven wheel diagonally opposite the highest slipping wheel on the driven axle is experiencing the highest mu surface. If the assumption is incorrect, further monitoring will allow alternate action.

Figure 2:
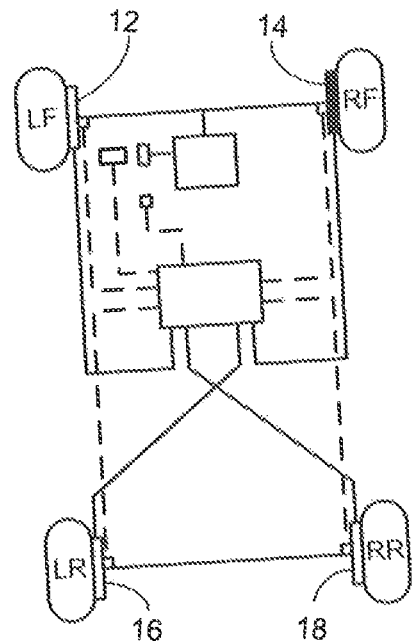
FIG. 2 illustrates a vehicle actuation of a right front brake.

FIG. 2 illustrates a condition where the undriven RF wheel experiences the highest mu surface based on wheel slip data. As a result, the RE will be more likely to grip the road surface in comparison to the LE wheel. As a result, the brake actuator of the RE wheel experiencing the highest mu surface is actuated. This allows this wheel to grip the road surface and attempt to hold the vehicle while the driven wheels try to regain propulsive traction. The re-application of the brake actuator with the high mu surface should be proportional to the speed of this respective wheel such that the pressure returns to zero when the vehicle is ending the rollback and is preparing to move forward.

Figure 3:
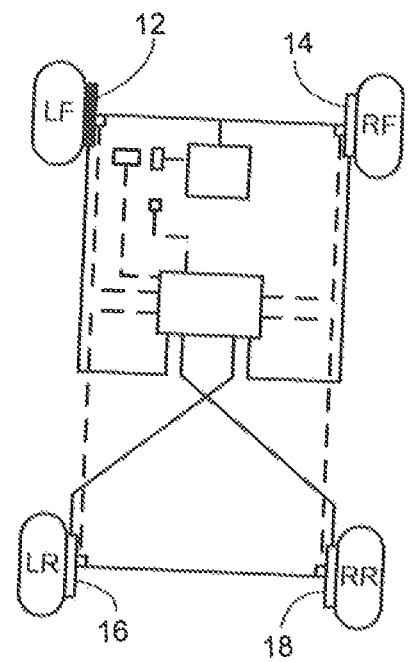
FIG. 3 illustrates a vehicle actuation of a left front brake.

FIG. 3 illustrates a condition where the undriven LF wheel experiences the highest mu surface based on wheel slip data. As a result, the LF wheel will be more likely to grip the road surface in comparison to the RF wheel. As a result, the brake actuator of the LF wheel experiencing the highest mu surface is actuated. This allows this wheel to grip the road surface and hold the vehicle while the driven wheels try to regain traction. The re-application of the brake actuator with the hi mu surface should be proportional to the speed of this respective wheel such that the pressure returns to zero when the vehicle is ending the rollback and is preparing to move forward.

Figure 4:
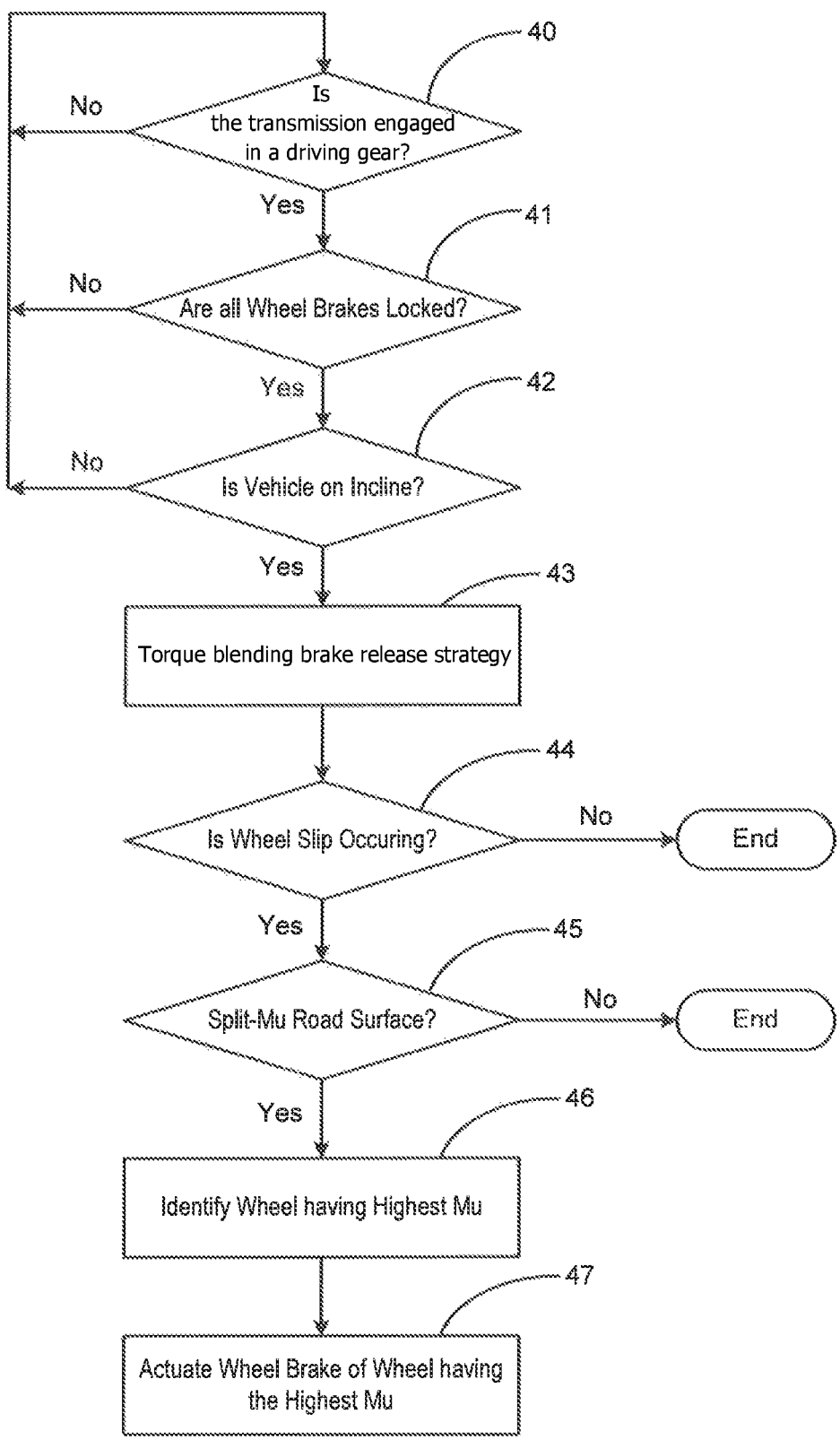
FIG. 4 illustrates a flowchart for a method of a rollback mitigation technique.

FIG. 4 illustrates a flowchart for the vehicle regaining traction after a wheel slip event immediately following a Hill Start Assist operation. In block 40, a determination is made whether the transmission is engaged in a driving gear. For an automatic transmission, the driving gear may be a forward gear—e.g., F—or reverse gear—e.g., R. For a manual transmission, the driving gear may be R, 1, 2, 3, etc. If the transmission is out of park or neutral, the routine proceeds to step 41; otherwise, the routine continues to check whether the transmission is out of park or neutral.

In block 41, a determination is made whether all the vehicle brake actuators are actuated and the wheels speeds are all zero. If this condition holds true, then the routine proceeds to step 42; otherwise, the routine returns to step 40.

In block 42, a determination is made that the vehicle is at rest on an inclined surface. Data from wheel speed sensors and the sensor 30 may provide the data required to make this assessment. If the vehicle is at rest, then the system determines that a hill start assist routine is enabled and the routine proceeds to step 43; otherwise, the routine returns to step 40.

In block 43, the hills start assist routine is initiated and each of the brake actuators are released after either a predetermined period of time has elapsed or a predetermined amount of engine or propulsive torque is generated to sufficiently start the vehicle moving in a forward direction should the tire have sufficient traction with the surface of the road. The brake actuators are released according to the torque blending brake release strategy.

In block 44, wheel slip conditions are determined immediately after release of each of the wheel actuators and increased throttle. If the wheel slip condition is detected, the routine proceeds to step 45; otherwise, the routine ends.

In block 45, a determination is made as to whether the vehicle is traveling on a split-mu road surface based on the wheel slip conditions. If the split-mu condition is detected, the routine proceeds to step 46; otherwise, the routine ends.

In block 46, the respective undriven wheel having the highest mu between the tire and the road surface is identified.

In block 47, the brake actuator of the identified undriven wheel having the highest mu relative to the road surface is actuated in addition to any standard stability control braking that may already be occurring. This allows the amount of rollback to be significantly reduced by applying actuation to the wheel brake of the undriven wheel experiencing the hi mu condition. The pressure of the brake actuator on the undriven wheel experiencing the hi mu condition should be proportional to the speed of that wheel, or the most reliable vehicle speed estimation. Thereby, brake actuation pressure returns to zero when the vehicle is ending the rollback, which indicates that the driven wheels have gained traction and the vehicle is prepared to move in the intended direction with sufficient tractive force.

The principle and mode of operation of this invention have been described in its various embodiments. However, it should be noted that this invention may be practiced otherwise than as specifically illustrated and described without departing from its scope.

What is claimed is:

1. A stability control system of a vehicle utilizing an electronic control unit that minimizes rollback of a vehicle as a result of wheel slip immediately following a hill start assist operation, the stability control system comprising:
 a plurality of wheel speed sensors measuring a speed of each wheel of the vehicle;
 a sensor for calculating a slope of a road surface; and
 an electronic control unit including an electronic braking control module, the electronic braking control module controlling actuation and de-actuation of vehicle brakes on an inclined surface, wherein immediately following the hill start assist operation on the inclined surface and after each wheel brake is de-actuated for allowing movement of the vehicle up the hill, a split-mu road surface condition is determined in response to wheel slip data for each of the wheels, wherein the electronic control unit determines a respective undriven or non-dominant driven wheel having a highest coefficient of friction, at a tire/road surface interface, among the undriven or non-dominant driven wheels as determined by the wheel speeds, wherein the electronic braking control module actuates the vehicle brake of the undriven or non-dominant driven wheel having the highest coefficient of friction for reducing rollback of the vehicle.

2. The stability control system of claim 1 wherein the electronic braking control module applies a braking force to the vehicle brake of the undriven or non-dominant driven wheel having the highest coefficient of friction that is proportional to the speed of the undriven or non-dominant driven wheel gf the vehicle.

3. The stability control system of claim 2 wherein, when the electronic control unit determines that the left front wheel is the undriven or non-dominant driven wheel having the highest coefficient of friction, a brake actuation force is applied to the left front wheel.

4. The stability control system of claim 2 wherein, when the electronic control unit determines that the right front wheel is the undriven or non-dominant driven wheel having the highest coefficient of friction, a brake actuation force is applied to the right front wheel.

5. The stability control system of claim 2 wherein the electronic braking control module zeros out the brake force to the front wheel when the rollback of the vehicle is stopped and the vehicle is prepared to start moving up the hill.

6. The stability control system of claim 1 wherein the wheel speed sensors include directional wheel speed sensors for determining when the vehicle is experiencing movement down the hill opposite an intended direction of travel.

7. The stability control system of claim 1 wherein a traction control module determines a wheel slip condition of each wheel.

8. A method of minimizing rollback of a vehicle as a result of wheel slip immediately following a hill start assist operation, the method comprising the steps of:
   sensing a wheel speed for each wheel of q plurality of wheels of the vehicle;
   calculating that the vehicle is on an inclined surface;
   de-actuating each vehicle brake actuator upon completion of the hill start assist operation;
   determining a rollback condition of the vehicle after release of each of the vehicle brakes;
   detecting a wheel slip condition for each undriven or non-dominant driven wheel;
   determining a split-mu road surface between the undriven or non-dominant driven wheels of the vehicle;
   determining which respective undriven or non-dominant driven wheel has the highest coefficient of friction at tire/road surface interface;
   actuating, by an electronic braking control module, the vehicle brake of the undriven or non-dominant driven wheel having q highest coefficient of friction for reducing the rollback of the vehicle down the hill.

9. The method of claim 8 wherein a braking force is applied to the vehicle brake of a front wheel of the plurality of wheels having the highest coefficient of friction that is proportional to the speed of the respective front wheel.

10. The method of claim 9 wherein, when the electronic control unit determines that the left front wheel is the undriven or non-dominant driven wheel having the highest coefficient of friction, a brake actuation force is applied to the left front wheel.

11. The method of claim 9 wherein, when the electronic control unit determines that the right front wheel is the undriven or non-dominant driven wheel having the highest coefficient of friction, a brake actuation force is applied to the right front wheel.

12. The method of claim 9 further comprising the steps of zeroing out the brake force to the undriven or non-dominant driven wheel when the rollback of the vehicle is stopped and the vehicle prepares to start moving up the hill.

13. The method of claim 8 wherein the vehicle is a rear wheel drive vehicle, and wherein directional rear wheel speed sensors mounted on front wheels determine when the vehicle is experiencing the rollback condition.

14. The method of claim 8 wherein a wheel slip condition is determined by a traction control module.

* * * * *